US009323518B1

(12) United States Patent
Savant et al.

(10) Patent No.: US 9,323,518 B1
(45) Date of Patent: Apr. 26, 2016

(54) SYSTEMS AND METHODS FOR MODIFYING APPLICATIONS WITHOUT USER INPUT

(71) Applicant: Symantec Corporation, Mountain View, CA (US)

(72) Inventors: Anubhav Savant, Culver City, CA (US); Ming Chen, Culver City, CA (US); Hai Zhao, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/445,704

(22) Filed: Jul. 29, 2014

(51) Int. Cl.
*G06F 9/44* (2006.01)
*G06F 7/40* (2006.01)
*G06F 9/445* (2006.01)
*G06F 21/56* (2013.01)

(52) U.S. Cl.
CPC ............... *G06F 8/65* (2013.01); *G06F 21/562* (2013.01)

(58) Field of Classification Search
None
See application file for complete search history.

(56) References Cited

U.S. PATENT DOCUMENTS

| 6,167,567 | A * | 12/2000 | Chiles et al. ................... 717/173 |
| 6,282,709 | B1 * | 8/2001 | Reha et al. ..................... 717/175 |
| 7,581,217 | B2 * | 8/2009 | Jhanwar et al. ................ 717/168 |
| 2004/0188511 | A1 * | 9/2004 | Sprigg et al. ....................... 713/1 |
| 2006/0242712 | A1 | 10/2006 | Linn et al. |
| 2008/0028391 | A1 * | 1/2008 | Nallipogu et al. ............ 717/174 |
| 2011/0047620 | A1 | 2/2011 | Mahaffey et al. |
| 2011/0247081 | A1 * | 10/2011 | Shelton ............................ 726/28 |
| 2012/0243043 | A1 | 9/2012 | Asai |
| 2012/0246630 | A1 * | 9/2012 | Kuzins et al. ................. 717/169 |
| 2013/0081120 | A1 * | 3/2013 | DeLuca et al. ..................... 726/7 |
| 2013/0254880 | A1 | 9/2013 | Alperovitch et al. |
| 2013/0283377 | A1 | 10/2013 | Das et al. |
| 2013/0333039 | A1 | 12/2013 | Kelly |
| 2014/0090077 | A1 * | 3/2014 | Jeong et al. ..................... 726/26 |
| 2014/0096246 | A1 | 4/2014 | Morrissey et al. |

OTHER PUBLICATIONS

"Sending Simple Data to Other Apps", http://developer.android.com/training/sharing/send.html, as accessed Jan. 7, 2014, (Jan. 4, 2012).
"Google Play", http://en.wikipedia.org/wiki/Google_Play, as accessed Jan. 7, 2014, Wikipedia, (Mar. 7, 2012).

(Continued)

*Primary Examiner* — Anil Khatri
*Assistant Examiner* — Binh Luu
(74) *Attorney, Agent, or Firm* — ALG Intellectual Property, LLC

(57) ABSTRACT

The disclosed computer-implemented method for modifying applications without user input may include (1) identifying a need to modify at least one application on the computing device, (2) initiating modification of the application on the computing device, (3) while the application is being modified, monitoring event notifications generated by an accessibility service that provides user interface enhancements for disabled individuals on an operating system installed on the computing device, (4) determining, based on an analysis of an event notification generated by the accessibility service, that a user of the computing device is prompted, on the computing device, to provide input necessary to complete the modification of the application, and (5) in response to detecting that the user is prompted to provide the input, automatically supplying the input in order to complete the modification of the application. Various other methods, systems, and computer-readable media are also disclosed.

18 Claims, 7 Drawing Sheets

(56) References Cited

OTHER PUBLICATIONS

Anubhav Savant; Systems and Methods for Informing Users About Applications Available for Download; U.S. Appl. No. 14/178,279, filed Feb. 12, 2014.

Anubhav Savant; Systems and Methods for Providing Information Identifying the Trustworthiness of Applications on Application Distribution Platforms; U.S. Appl. No. 14/338,539, filed Jul. 23, 2014.

"AccessibilityService", http://developer.android.com/reference/android/accessibilityservice/Accessibility Service.html, as accessed May 30, 2014, Android, (Nov. 15, 2009).

"Digital distribution", http://en.wikipedia.org/wiki/Digital_distribution, as accessed May 30, 2014, Wikipedia, (Jun. 15, 2005).

"Building Accessibility Services", http://developer.android.com/guide/topics/ui/accessibility/services.html, as accessed May 30, 2014, Android, (Apr. 14, 2012).

Zeqing Qi, et al; Systems and Methods for Updating Applications; U.S. Appl. No. 14/305,497, filed Jun. 16, 2014.

Anubhav Savant; Systems and Methods for Evaluating Content Provided to Users via User Interfaces; U.S. Appl. No. 14/698,885, filed Apr. 29, 2015.

"ApplicationId versus PackageName", http://tools.android.com/tech-docs/new-build-system/applicationid-vs-packagename, as accessed Mar. 3, 2015, Android Tools Project Site, (Oct. 3, 2014).

Beal, Vangie "API—application program interface", http://www.webopedia.com/TERM/A/API.html, as accessed Mar. 3, 2015, Webopedia, (Jun. 21, 2000).

"AccessibilityEvent", http://developer.android.com/reference/android/view/accessibility/AccessibilityEvent.html, as accessed Mar. 3, 2015, Android Developers, (Oct. 10, 2009).

"Greenify", https://play.google.com/store/apps/details?id=com.oasisfeng.greenify&hl=en, as accessed May 30, 2014, (Jun. 19, 2013).

"Receiving Simple Data from Other Apps", http://developer.android.com/training/sharing/receive.html, as accessed Jan. 7, 2014, (Jan. 3, 2012).

"Is it possible to detect Android app uninstall?", http://stackoverflow.com/questions/6209730/is-it-possible-to-detect-android-app-uninstall, as accessed Jun. 25, 2015, Stack Overflow, (Jun. 2, 2011).

"Android not receiving Intent Action_Package_Removed in the removed package", http://stackoverflow.com/questions/3648166/android-not-receiving-intent-action-package-removed-in-the-removed-package, as accessed Jun. 25, 2015, Stack Overflow, (Sep. 5, 2010).

"AccessibilityService", http://developer.android.com/reference/android/accessibilityservice/AccessibilityService.html, as accessed Jun. 25, 2015, Android Developers, (Nov. 15, 2009).

"Developing an Accessibility Service", http://developer.android.com/training/accessibility/service.html, as accessed Jun. 25, 2015, Android Developers, (Apr. 13, 2012).

"AlertDialog", http://developer.android.com/reference/android/app/AlertDialog.html, as accessed Jun. 25, 2015, Android Developers, (Feb. 18, 2009).

"Artimys", https://artimysapi.appspot.com/, as accessed Jun. 4, 2015, (2013).

Coyne, Sarah M., et al., "Profanity in Media Associated With Attitudes and Behavior Regarding Profanity Use and Aggression", http://pediatrics.aappublications.org/content/early/2011/10/14/peds.2011-1062.abstract, as accessed Jun. 4, 2015, Pediatrics, American Academy of Pediatrics, (Oct. 17, 2011).

"android.accessibilityservice", https://developer.android.com/reference/android/accessibilityservice/package-summary.html, as accessed Jun. 4, 2015, Android Developers, (Sep. 22, 2009).

Kraunelis, Joshua et al., "On Malware Leveraging the Android Accessibility Framework", http://www.umac.mo/rectors_office/docs/weizhao_cv/pub_refereed_journals/2015_ref_journals/On%20Malware.pdf, as accessed Jun. 4, 2015, ICST Transactions Preprint, (2013 or earlier).

"Adblock Plus", https://adblockplus.org/, as accessed Jun. 4, 2015, (Aug. 21, 2006).

"AccessibilityEvent", http://developer.android.com/reference/android/view/accessibility/AccessibilityEvent.html, as accessed Jun. 4, 2015, Android Developers, (Oct. 10, 2009).

\* cited by examiner

SYSTEMS AND METHODS FOR MODIFYING APPLICATIONS WITHOUT USER INPUT

BACKGROUND

In order to increase the safety and performance of a computing device, a security policy and/or administrator may recommend modifying an application on the computing device. For example, an anti-malware engine may determine that an application installed on a computing device represents a security threat and should therefore be removed from the computing device. In addition, an administrator may determine that one or more applications that are beneficial to the functionality and/or security of a computing device should be updated or installed on the computing device.

Unfortunately, traditional systems for modifying applications may prompt or even require users to enter input (e.g., click a button, enter authentication credentials, etc.) in order to complete the desired modification. As a result, users may intentionally or inadvertently disregard important security recommendations, potentially exposing their computing devices to malicious software. As such, the current disclosure identifies and addresses a need for more efficient and effective systems and methods for modifying applications on computing devices.

SUMMARY

As will be described in greater detail below, the instant disclosure describes various systems and methods for modifying applications without user input by determining that a user is required to enter input in order to complete the modification of an application based on analyzing event notifications generated by an accessibility service. The disclosed systems and methods may then supply the input without requiring user interaction.

In one example, a computer-implemented method for performing such a task may include (1) identifying a need to modify at least one application on the computing device, (2) initiating modification of the application on the computing device, (3) while the application is being modified, monitoring event notifications generated by an accessibility service that provides user interface enhancements for disabled individuals on an operating system installed on the computing device, (4) determining, based on an analysis of an event notification generated by the accessibility service, that a user of the computing device is prompted, on the computing device, to provide input necessary to complete the modification of the application, and (5) in response to determining that the user is prompted to provide the input, automatically supplying the input in order to complete the modification of the application. In some examples, prior to monitoring the event notifications, the method may include prompting the user to enable permissions on the computing device required by the accessibility service.

In some embodiments, identifying the need to modify the application may include identifying an administrator-defined policy for the computing device that requires the installation of the application onto the computing device. In other examples, identifying the need to modify the application may include determining that an update is available for the application. Additionally or alternatively, identifying the need to modify the application may include determining that the application represents a security threat and should therefore be uninstalled from the computing device.

In some examples, initiating modification of the application may include initiating modification of the application in response to an instruction from a user of the computing device. Additionally or alternatively, initiating modification of the application may include automatically initiating modification of the application without user input.

In some embodiments, the event notifications generated by the accessibility service may include an indication that a user interface of the computing device has changed. Furthermore, in some examples, the event notifications may include information that indicates the content of the user interface that changed.

In some embodiments, determining that the user is prompted to provide input necessary to complete the modification of the application may include analyzing a layout and/or content of an active window displayed on the computing device. Additionally or alternatively, determining that the user is prompted to provide the input may include determining that the user is prompted to click a button, determining that the user is prompted to enter credentials that authenticate the user, and/or determining that the user is prompted to enable permissions on the computing device.

In some examples, automatically supplying the input in order to complete the modification of the application may include removing the user's control of the computing device and then displaying, on the active window of the computing device, the progress of the modification of the application. In these examples, displaying the progress of the modification on the active window may include overlaying a screen indicating the progress of the modification on a user interface that prompts the user to complete the modification.

In one embodiment, a system for implementing the above-described method may include (1) an identification module that identifies a need to modify at least one application on a computing device, (2) an initiating module that initiates modification of the application on the computing device, (3) a monitoring module that, while the application is being modified, monitors event notifications generated by an accessibility service that provides user interface enhancements for disabled individuals on an operating system installed on the computing device, (4) a determination module that determines, based on an analysis of an event notification generated by the accessibility service, that a user of the computing device is prompted, on the computing device, to provide input necessary to complete the modification of the application, and (5) a supplying module that, in response to determining that the user is prompted to provide the input, automatically supplies the input in order to complete the modification of the application. In addition, the system may include at least one processor that executes the identification module, the initiating module, the monitoring module, the determination module, and the supplying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a need to modify at least one application on the computing device, (2) initiate modification of the application on the computing device, (3) while the application is being modified, monitor event notifications generated by an accessibility service that provides user interface enhancements for disabled individuals on an operating system installed on the computing device, (4) determine, based on an analysis of an event notification generated by the accessibility service, that a user of the computing device is prompted, on the computing device, to provide input necessary to complete the modification of the application, and (5) in response to determining that the user is prompted to provide the input, automatically supply the input in order to complete the modification of the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
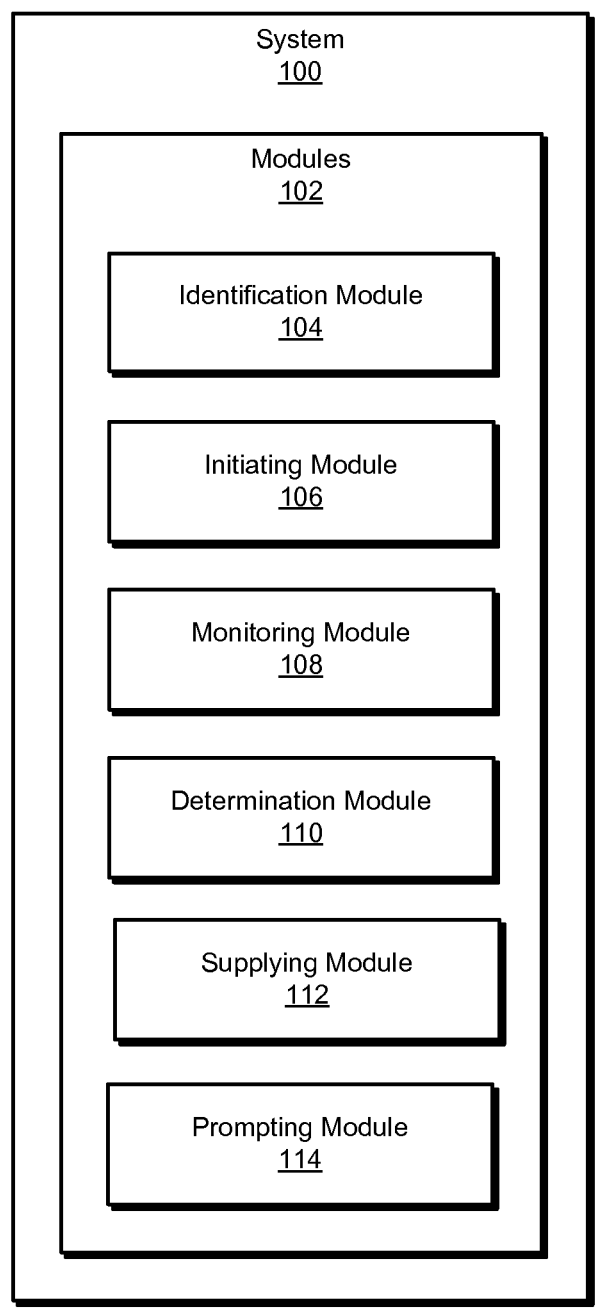
FIG. 1 is a block diagram of an exemplary system for modifying applications without user input.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for modifying applications without user input. As will be explained in greater detail below, by detecting and analyzing event notifications generated by an accessibility service, the disclosed systems and methods may determine whether a user is required to provide input in order to complete a desired application-modification operation, such as installing, uninstalling, or updating an application on a computing device. Once the required input is identified, the systems and methods described herein may supply the input without requiring any user involvement. As such, the disclosed systems and methods may ensure that a computing device successfully completes desired application modifications, such as those that are beneficial to the safety and performance of the computing device, without user input or intervention.

The following will provide, with reference to FIGS. 1-2 and 4-5, detailed descriptions of exemplary systems for modifying applications without user input. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

As illustrated in this figure, exemplary system 100 may include one or more modules 102 for performing one or more tasks. For example, and as will be explained in greater detail below, exemplary system 100 may include an identification module 104 that identifies a need to modify at least one application on a computing device. Exemplary system 100 may also include an initiating module 106 that initiates modification of the application on the computing device.

In addition, and as will be described in greater detail below, exemplary system 100 may include a monitoring module 108 that, while the application is being modified, monitors event notifications generated by an accessibility service that provides user interface enhancements for disabled individuals on an operating system installed on the computing device. Furthermore, exemplary system 100 may include a determination module 110 that determines, based on an analysis of an event notification generated by the accessibility service, that a user of the computing device is prompted on the computing device, to provide input necessary to complete the modification of the application. Exemplary system 100 may also include a supplying module 112 that, in response to determining that the user is prompted to provide the input, automatically supplies the input in order to complete the modification of the application. Finally, exemplary system 100 may include a prompting module 114 that prompts the user to enable permissions on the computing device required by the accessibility service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
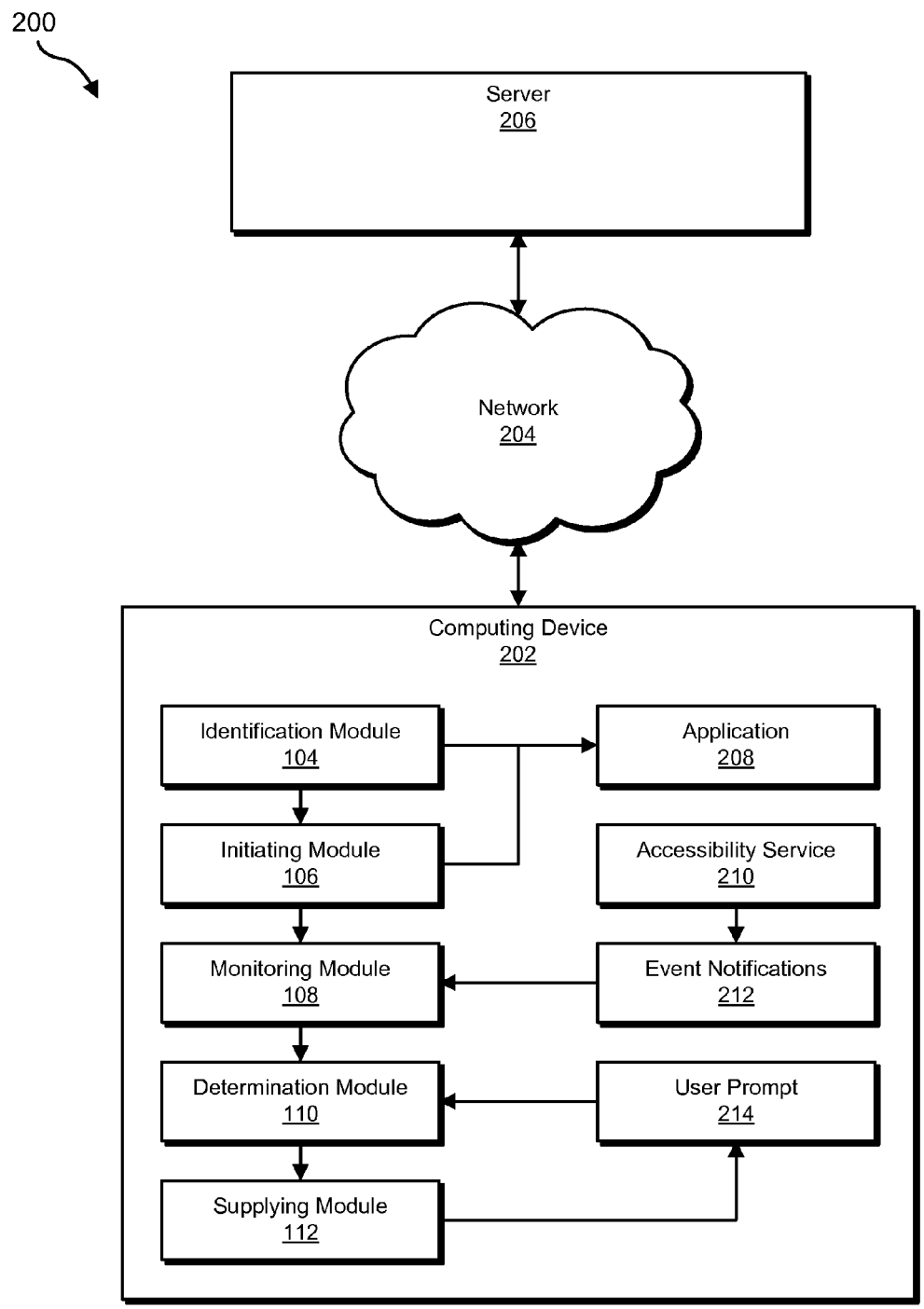
FIG. 2 is a block diagram of an additional exemplary system for modifying applications without user input.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 in order to supply input necessary to complete the modification of an application on computing device 202. Additionally or alternatively, server 206 may be programmed with one or more of modules 102 in order to analyze event notifications generated by an accessibility service.

In one embodiment, one or more of modules 102 from FIG. 1 may, when executed by at least one processor of computing device 202 and/or server 206, enable computing device 202 and/or server 206 to modify applications without user input. For example, and as will be described in greater detail below, identification module 104 may cause computing device 202 and/or server 206 to identify a need to modify at least one application (e.g., application 208) on a computing device (e.g., computing device 202). Next, initiating module 106 may cause computing device 202 and/or server 206 to initiate modification of the application on the computing device. In addition, while the application is being modified, monitoring module 108 may cause computing device 202 and/or server 206 to monitor event notifications (e.g., event notifications 212) generated by an accessibility service (e.g., accessibility service 210) that provides user interface enhancements for disabled individuals on an operating system installed on the computing device.

Furthermore, determination module 110 may cause computing device 202 and/or server 206 to determine, based on an analysis of an event notification generated by the accessibility service, that a user of the computing device is prompted (e.g., via user prompt 214) to provide input necessary to complete the modification of the application. Finally, in response to determining that the user is prompted to provide the input, supplying module 112 may cause computing device 202 and/or server 206 to automatically supply the input in order to complete the modification of the application.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of analyzing event notifications generated by an accessibility service. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
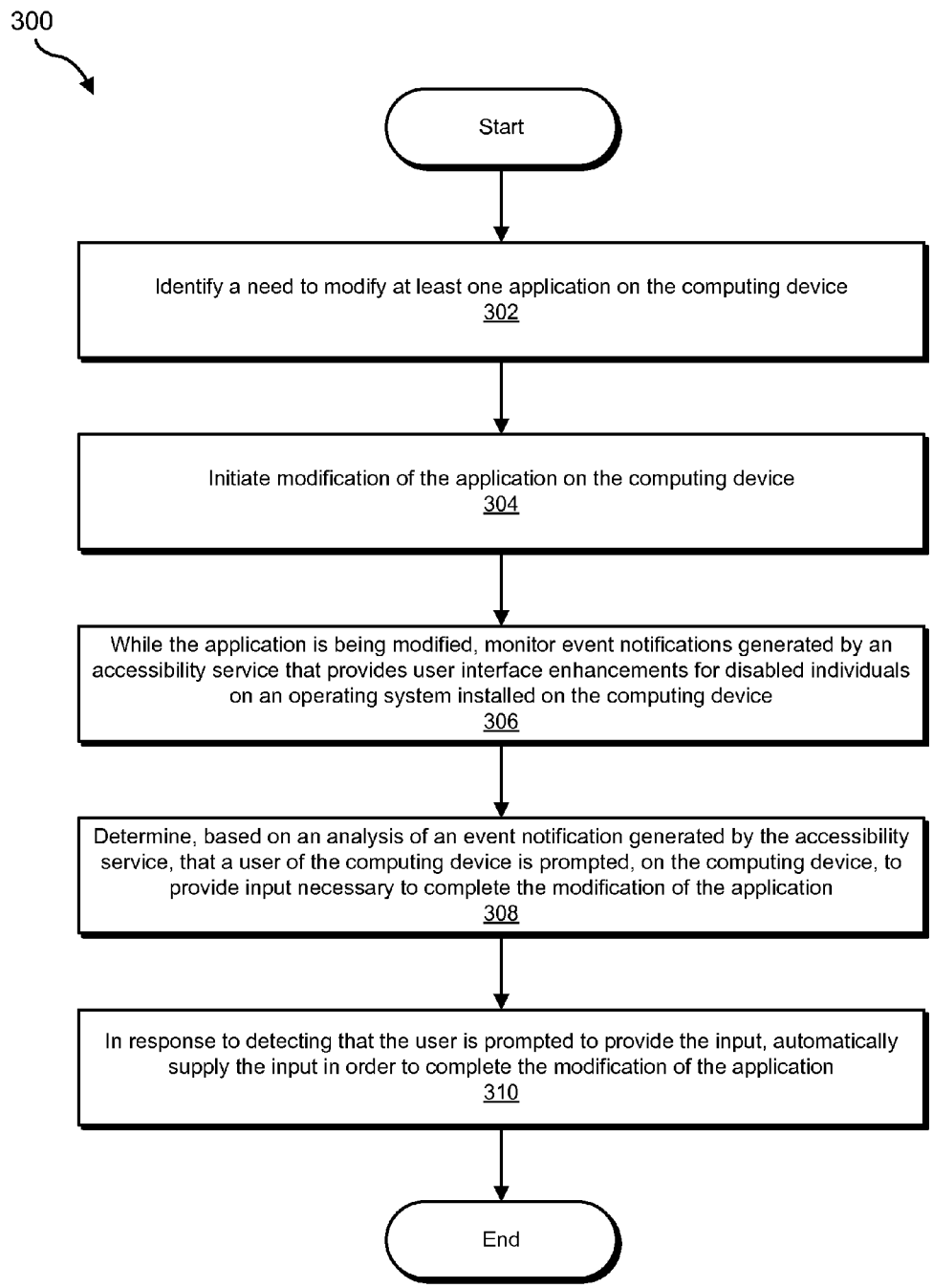
FIG. 3 is a flow diagram of an exemplary method for modifying applications without user input.

FIG. 3 is a flow diagram of an exemplary computer-implemented method 300 for modifying applications without user input. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a need to modify at least one application on a computing device. For example, identification module 104 may, as part of computing device 202 in FIG. 2, identify the need to modify application 208 on computing device 202.

The term "application," as used herein, generally refers to any type or form of software, file, or executable code that may be installed, run, deployed, or otherwise implemented on a computing system. Examples of applications include, without limitation, web browsers, operating systems, communication applications, word and number processing applications, gaming applications, security applications, cloud-based applications, and media applications.

The systems described herein may identify the need to modify the application in a variety of ways. In some examples, identification module 104 may identify a need to install application 208 onto computing device 202. For example, identification module 104 may identify an administrator-defined policy for computing device 202 that requires the installation of application 208 onto computing device 202. Specifically, computing device 202 may belong to an employee within an organization and an IT administrator within the organization may recommend or require that all employees install application 208 onto their computing devices. In another example, identification module 104 may identify the need to install application 208 by identifying (e.g., by browsing applications hosted on an application distribution platform) an application that may improve the security and/or performance of computing device 202.

In additional examples, identification module 104 may identify the need to modify application 208 by determining that an update is available for application 208. For example, application 208 may already be installed on computing device 202 and identification module 104 may receive a notification that indicates an update is available, perform a web search for available updates, or otherwise identify an available update for application 208.

Furthermore, identification module 104 may identify the need to modify application 208 by determining that application 208 represents a security threat and should therefore be uninstalled from computing device 202. For example, identification module 104 may scan and/or direct an external anti-malware engine to scan applications installed on computing device 202 for malware. In addition, identification module 104 may compare the applications installed on computing device 202 against a list of applications known to contain malware. Identification module 104 may then determine, based on the results of the malware scan and/or additional analyses, that application 208 contains malicious files and should therefore be uninstalled.

In some embodiments identification module 104 may identify the need to modify application 208 by identifying a notification, pop-up window, dialog box, or other alert presented to the user that directs the user to perform the modification. In other words, identification module 104 may infer the need to modify application 208 based on determining that the user is prompted to modify application 208 (e.g., in order to comply with an administrator-defined security policy). However, in other examples, identification module 104 may directly identify the need to modify application 208 by directly analyzing application 208 (e.g., by searching for updates, scanning for malware, etc.). In these examples, identification module 104 may alert the user about the need to modify application 208.

Additionally, identification module 104 may identify the need to modify application 208 in part by determining the importance of the modification. For example, identification module 104 may determine whether the modification represents a significant improvement in the security and/or performance of computing device 202 before directing one or more of modules 102 to complete the modification. Specifically, identification module 104 may determine that an administrator requires the modification, that computing device 202 may be vulnerable to malware without the modification, that computing device 202 requires the modification in order to maintain proper functionality, and/or any additional determination of importance.

Returning to FIG. 3, at step 304 one or more of the systems described herein may initiate modification of the application on the computing device. For example, initiating module 106 may, as part of computing device 202 in FIG. 2, initiate modification of application 208 on computing device 202.

The systems described herein may initiate modification of the application in a variety of ways. In some embodiments, initiating module 106 may initiate modification of application 208 based on the type of modification identified by identification module 104. For example, if the modification requires application 208 to be installed or updated on computing device 202, initiating module 106 may facilitate launching an application distribution platform that hosts application 208 and/or updates for application 208. Specifically, initiating module 106 may launch an application distribution platform and perform a search for or otherwise access the page within the application distribution platform that displays application 208.

The term "application distribution platform," as used herein, generally refers to any type or form of online service, application, or software framework used to deliver media content to users via a network. Application distribution platforms may distribute a variety of media types, such as text, audio, and video files, gaming applications, security applications, work-related applications, and/or any additional type of media. In addition, application distribution platforms may be used to deliver media to both mobile and non-mobile computing devices. Examples of application distribution platforms include, without limitation, GOOGLE PLAY, AMAZON APPSTORE, WINDOWS STORE, and APP STORE (for iOS).

In other embodiments, if the modification requires the uninstallation of application 208, initiating module 106 may launch an application manager installed on computing device 202 that facilitates uninstalling applications from computing device. The term "application manager," as used herein, generally refers to any type or form of software, application, or executable code running on a computing device that provides a user a platform for modifying (e.g., removing or uninstalling) other applications from the computing device.

In some examples, initiating module 106 may initiate the modification without user input. For example, initiating module 106 may automatically launch an application distribution platform or application manager used to perform the modification. In this example, initiating module 106 may remove the user's control of computing device 202 while the application distribution platform or application manager is launched to help ensure that the modification is accomplished. In addition, initiating module 106 may provide a prompt to the user that directs the user to launch the application distribution platform or application manager.

In some embodiments, initiating module 106 may initiate modification of application 208 in response to an instruction from the user. For example, identification module 104, an administrator, a security application installed on computing device 202, or an additional entity or service may notify the user of the need to modify application 208. Initiating module 106 may then determine that the user has initiated the modification by launching an application manager or application distribution platform, providing input to a dialog box, or initiated the modification in any additional manner.

Returning to FIG. 3, at step 306 one or more of the systems described herein may, while the application is being modified, monitor event notifications generated by an accessibility service that provides user interface enhancements for disabled individuals on an operating system installed on the computing device. For example, monitoring module 108 may, as part of computing device 202, monitor event notifications 212 generated by accessibility service 210 while application 208 is being modified.

The term "accessibility service," as used herein, generally refers to any type or form of application running on a computing device that monitors user interfaces presented to a user of the computing device. In some examples, an accessibility service may monitor user interfaces in order to notify the user of the content of the user interfaces. For example, an accessibility service may assist users with audio or visual impairments (e.g., by reading text displayed on a screen, highlighting or enlarging certain elements of a user interface, providing input to user interfaces, etc.). Additionally or alternatively, an accessibility service may assist users who are temporarily unable to fully interact with their computing device.

In some embodiments, an accessibility service may monitor user interfaces by detecting a state transition in a user interface. For example, an accessibility service may detect user interactions with a computing device, such as by detecting that a user has clicked a button, changed the focus of a screen (e.g., by zooming in), entered text into an input field, etc. An accessibility service may also detect changes in user interfaces produced by an application or operating system running on a computing device, such as by determining that an application is executing, identifying a prompt requesting user input, detecting an audio notification, etc.

Specifically, in some examples, an accessibility service may detect changes in user interfaces by receiving event notifications. The term "event notification," as used herein, generally refers to any type or form of electronic message or portion of code distributed to an accessibility service in response to a state transition in one or more user interfaces. In some examples, event notifications may be generated only when an accessibility service and/or certain permissions are enabled on a computing device. In addition, event notifications may contain a variety of information associated with a user interface transition. For example, an event notification may simply alert an accessibility service that a change has occurred. In addition, an event notification may contain information indicating what type of change occurred. As an example, in an ANDROID operating system, an event notification of the type "TYPE_TOUCH_INTERACTION_START" may indicate that a user has begun to touch the touchscreen of a computing device. In addition, an event notification of the type "TYPE_WINDOW_STATE_CHANGED" may indicate that a pop-up window, menu, or dialog box has appeared on the screen of a computing device. Furthermore, in addition to labelling the type of event that occurred in a user interface, an event notification may include information that describes the origin and/or content of the event. For example, an accessibility service may request that an event notification include the time that the event occurred, information about the source of the event, as well as the layout and content of the active window of the computing device at the time the event occurred. The term "active window," as used herein, generally refers to any user interface, notification, or audio-visual display that is currently presented to a user on the screen of a computing device.

The systems described herein may monitor event notifications 212 generated by accessibility service 210 in a variety of ways. In some examples, accessibility service 210 may generate event notifications 212 in response to each change in a user interface of computing device 202. However, in some examples, monitoring module 108 may trigger accessibility service 210 to generate event notifications 212 only after identifying the need to modify application 208. Monitoring module 108 may then identify each of event notifications 212 while and/or after event notifications 212 are sent to accessibility service 210.

Furthermore, in some examples, accessibility service 208 may require certain permissions in order to access and report information associated with event notifications. As such, before monitoring module 104 monitors event notifications 210, prompting module 114 may prompt (e.g., by displaying a pop-up window or notification on the active window of computing device 202) the user to enable permissions required by accessibility service 208.

Returning to FIG. 3, at step 308 one or more of the systems described herein may determine, based on an analysis of an event notification generated by the accessibility service, that a user of the computing device is prompted, on the computing device, to provide input necessary to complete the modification of the application. For example, determination module 110 may, as part of computing device 202 in FIG. 2, determine that the user of computing device 202 is prompted by user prompt 214 to provide input necessary to complete the modification of application 208 based on an analysis of one of event notifications 212 generated by accessibility service 210.

The term "user prompt," as used herein, generally refers to any type or form of field, textbox, or clickable region within a pop-up window, notification, dialog box, or user interface through which a user may enter input. In some examples, the input may direct the operating system and/or other application on a computing device to perform a specific action (e.g., modifying an application on the computing device).

The systems described herein may determine that the user is prompted to provide input necessary via the user prompt in a variety of ways. In some examples, determination module 110 may determine the type of input required by user prompt 214. For example, determination module 110 may determine that the user is prompted to click a button (e.g. labelled "install," "download," "remove," "uninstall," "update," "allow," etc.). In addition, determination module 110 may determine that the user is prompted to enter credentials that authenticate the user. For example, determination module 104 may determine that user prompt 214 requires a username and/or password that authenticates the user as an "administrator" of computing device 202. Additionally or alternatively, determination module 110 may determine that user prompt 214 prompts the user to enable permissions on computing device 202 that allow the installation, uninstallation, or update of application 208.

Furthermore, determination module 110 may determine the context and/or origin of user prompt 214. In some examples, determination module 110 may determine that user prompt 214 is created and displayed to the user by the operating system of computing device 202. For example, the operating system of computing device 202 may require user input before permitting certain changes on computing device 202, such as installing, uninstalling, or updating application 208. As such, the operating system may display user prompt 214 in response to initiating module 106 initiating modification of application 208. In other examples, determination module 110 may determine that user prompt 214 represents a user prompt directly on an application distribution platform or application manager that facilitates the modification of application 208. For example, after the user and/or initiating module 106 launches an application manager, determination module 110 may identify user prompt 214 as a button on the application distribution platform.

Figure 4:
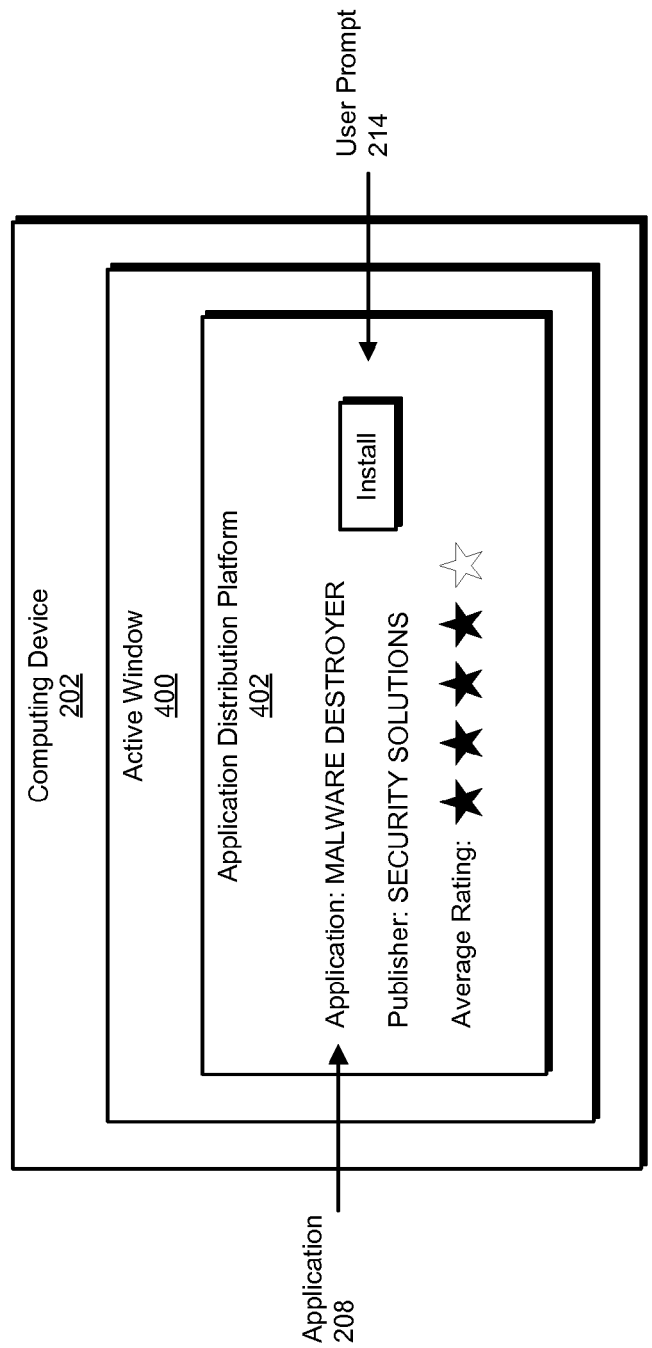
FIG. 4 is an illustration of an exemplary user interface that prompts a user to modify an application.

As an example, FIG. 4 illustrates user prompt 214 on an application distribution platform 402. In this example, initiating module 106 may have initiated the modification of application 208 by displaying, on an active window 400, the page of application distribution platform 402 that hosts application 208 for download. As shown in FIG. 4, application distribution platform 402 may display the name of application 208 (in this example, "Malware Destroyer"), the publisher of application 208 (in this example, "Security Solutions"), and the average rating of application 208. In addition, application distribution platform 402 may display an "install" button that enables the user to install application 208 onto computing device 202. In this example, determination module may identify the install button as user prompt 214.

In some examples, determination module 110 may identify user prompt 214 by applying a variety of analyses to event notifications 212 in order to identify the event notification that indicates user prompt 214. In some examples, determination module 110 may analyze information included within the event notification that indicates the source of the event notification. For example, determination module 110 may determine that the event notification was generated in response to the operating system of computing device 202 displaying a notification to the user. In addition, determination module 110 may determine that the event notification was generated in response to an application distribution platform or application manager launching on computing device 202. Referring to the example of FIG. 4, determination module 110 may determine that the event notification was generated in response to launching application distribution platform 402.

Additionally or alternatively, determination module 108 may identify user prompt 214 by analyzing the active window of computing device 202. Specifically, determination module 108 may analyze a layout and/or content of the active window. For example, determination module 110 may search the images and/or information about the images presented to the user on the screen of computing device 202 for an indication of a user input field. In this example, determination module 110 may receive information about the layout and content of the active window from the event notification and/or by directly analyzing an image of the active window.

In some examples, determination module 110 may analyze the layout and content of the active window by applying a set of rules to the active window based at least in part on characteristics of computing device 202, the type of user prompt presented to the user, and/or the application manager or application distribution platform that facilitates the modification of application 208. For example, in addition to analyzing information included within the event notification, determination module 110 may apply a set of rules to the active window based on the size of computing device 202, the type of computing device 202, the operating system installed on computing device 202, other applications installed on computing device 202, personalized settings applied to computing device 202, and/or any additional characteristics that may influence the placement or appearance of a user input field on the active window of computing device 202.

Referring again to the example of FIG. 4, determination module 110 may identify user prompt 214 on application distribution platform 402 at least in part by identifying the name and/or type of application distribution platform 402, as well as the type of computing device 202. For example, determination module 110 may identify application distribution platform 402 as GOOGLE PLAY (e.g., by analyzing the event notification) and computing device 202 as a smartphone running the ANDROID operating system. As such, determination module 110 may identify user prompt 214 on application distribution platform 402 by determining that GOOGLE PLAY running on an ANDROID smartphone generally displays user prompts on the upper right hand side of the active window.

Returning to FIG. 3, at step 310 one or more of the systems described herein may, in response to determining that the user is prompted to provide the input, automatically supply the input in order to complete the modification of the application. For example, supplying module 112 may automatically supply the input in response to identifying user prompt 214.

The systems described herein may supply the input necessary to complete the modification of the application in a variety of ways. In some examples, supplying module 112 may supply the input via accessibility service 210. As previously mentioned, accessibility services may detect and analyze changes in user interfaces in order to perform actions on a computing device that may assist users access features or content on the computing device and/or perform actions that users may be unable to perform themselves. Specifically, an accessibility service may interact with user interfaces by performing one or more accessibility actions. As such, supplying module 112 may direct accessibility service 210 to provide the identified input required to complete the modification of application 208 via an accessibility action. Referring to the example of FIG. 4, supplying module 112 may direct accessibility service 210 to click the install button on application distribution platform 402 in order to install application 208 onto computing device 202.

In other examples, supplying module 112 may provide the required input independently from accessibility service 210. For example, if user prompt 214 requires the user's credentials, supplying module 112 may access the credentials and directly supply the credentials to user prompt 214. In general, supplying module 112 may supply the required input in any manner such that no user interaction is required and the user may not interfere with completing the modification.

In some embodiments, supplying module 112 may ensure that the user does not interfere with completing the modification by removing the user's control of computing device 202 while the modification is performed. For example, supplying module 112 may prohibit the user from entering input into computing device 202 and/or opening or closing any applications on computing device 202. Supplying module 112 may remove the user's control by overriding instructions issued by the user, disabling permissions that allow the user to issue instructions, and/or removing the user's control in any additional manner.

Furthermore, in some examples, supplying module 112 may display the progress of the modification on the active window of computing device 202 while the modification is performed and while the user is suspended from controlling computing device 202. For example, supplying module 112 may display the progress of the modification on the active window by overlaying a screen on user prompt 214 that indicates the progress of the modification. The screen may present the progress of the modification in a variety of ways. In some examples, the screen may simply indicate whether the modification is still in progress or whether the modification has been completed. In other examples, the screen may display a progress bar that dynamically indicates the percentage of the modification that has been completed and/or the estimated time required to complete the modification. The screen may also display a variety of additional information about the modification, such as the actions being performed in the modification and/or the purpose of the modification. Once the modification is complete, supplying module 112 may remove the screen overlaid on the active window and return control of computing device 202 to the user.

Figure 5:
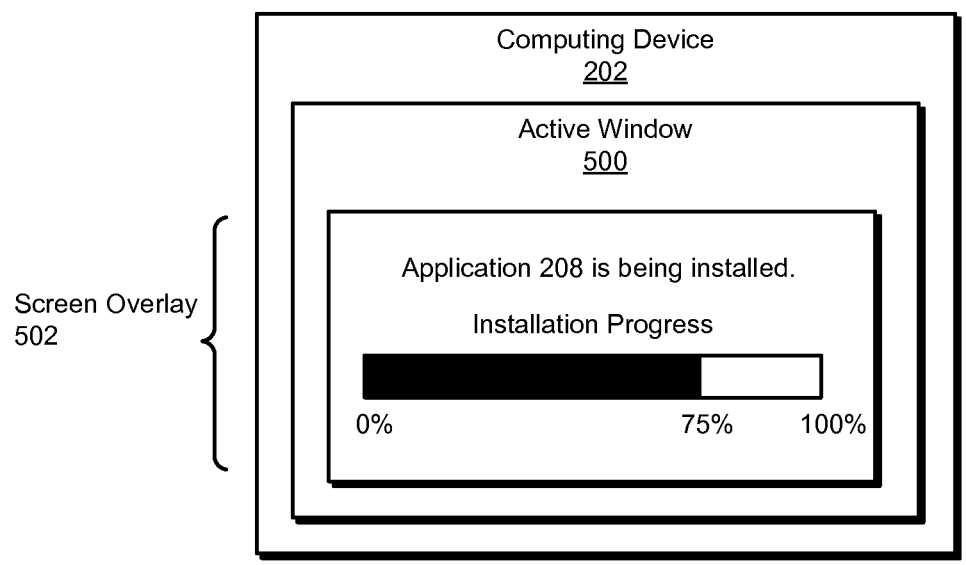
FIG. 5 is an illustration of an exemplary screen presented to a user while an application is being modified.
Figure 6:
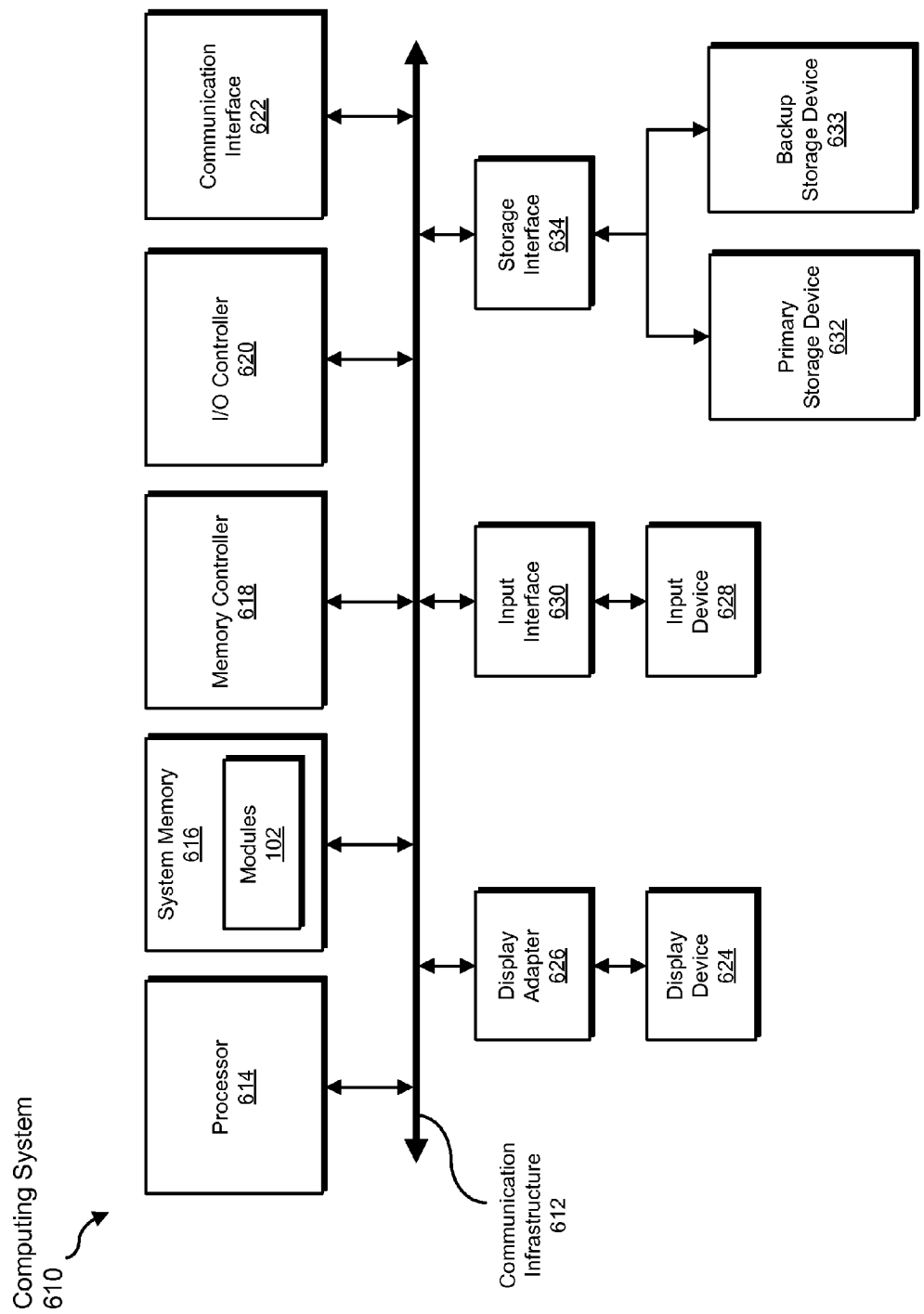
FIG. 6 is a block diagram of an exemplary computing system capable of implementing one or more of the embodiments described and/or illustrated herein.

As an example, FIG. 5 illustrates an exemplary screen overlay 502 on an active window 500. As shown in FIG. 6, screen overlay 502 may notify the user that application 208 is being installed onto computing device 202. In addition, screen overlay 502 may display a progress bar that indicates the percentage (in this example, "75%") of the installation that has been completed.

The systems and methods described herein may be implemented in a variety of ways and provide a number of advantages. As was explained above, by detecting and analyzing event notifications generated by an accessibility service, the disclosed systems and methods may determine that a user is required to provide input in order to complete a desired application-modification operation, such as installing, uninstalling, or updating an application on a computing device. Once the required input is identified, the systems and methods described herein may supply the required input without requiring any user involvement. As such, the disclosed systems and methods may ensure that a computing device successfully completes desired modifications, such as those that are beneficial to the safety and performance of the computing device, without user involvement or intervention.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
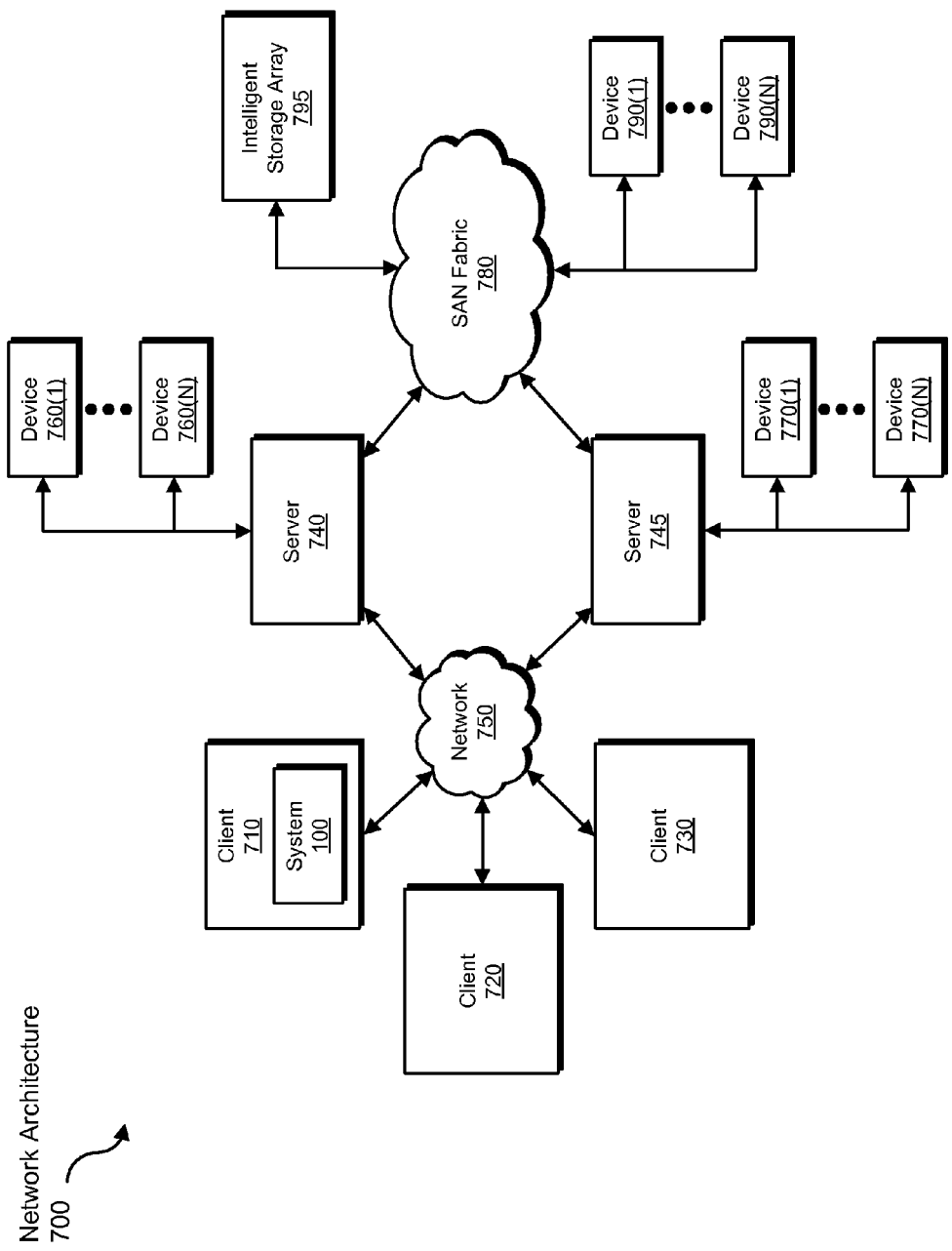
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for modifying applications without user input.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive or identify an application to be modified on a computing device, transform the application on the computing device, output a result of the transformation to a user of the computing device, and use the transformation to enhance the computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for modifying applications without user input, at least a portion of the method being performed by a computing device comprising at least one processor, the method comprising:

prompting a user of the computing device to enable permissions on the computing device required by an accessibility service that provides user interface enhancements for disabled individuals on an operating system installed on the computing device;

after the permissions are enabled, identifying a need to modify at least one application on the computing device based on an administrator-defined policy associated with the application;

in response to identifying the need to modify the application based on the administrator-defined policy, removing the user's control of the computing device to prevent the user from interfering with the modification;

after removing the user's control of the computing device:
  initiating modification of the application on the computing device;
  while the application is being modified, monitoring event notifications generated by the accessibility service;
  determining, based on an analysis of an event notification generated by the accessibility service, that the user of the computing device is prompted, on the computing device, to enable permissions necessary to modify the application;
  in response to determining that the user is prompted to enable the permissions, automatically enabling the permissions via the accessibility service in order to complete the modification of the application.

2. The method of claim 1, wherein the administrator-defined policy requires at least one of:
  the application to be installed onto the computing device:
  the application to receive an available update;
  the application to be uninstalled from the computing device based on the application representing a security threat.

3. The method of claim 1, wherein initiating modification of the application comprises at least one of:
  launching an application distribution platform installed on the computing device that facilitates installing and/or updating applications;
  launching an application manager installed on the computing device that facilitates uninstalling applications.

4. The method of claim 1, wherein removing the user's control of the computing device comprises at least one of:
  prohibiting the user from entering input into the computing device;
  overriding instructions issued by the user.

5. The method of claim 1, wherein the event notifications generated by the accessibility service include at least one of:
  an indication that a user interface of the computing device has changed;
  information that indicates content of the user interface.

6. The method of claim 1, wherein determining that the user is prompted to enable the permissions necessary to modify the application comprises analyzing at least one of:
  a layout of an active window displayed on the computing device;
  content of the active window.

7. The method of claim 1, wherein determining that the user is prompted to enable the permissions necessary to modify the application comprises at least one of:
  determining the user is prompted to click a button;
  determining the user is prompted to enter credentials that authenticate the user.

8. The method of claim 1, wherein automatically supplying the input in order to complete the modification of the application comprises displaying, on an active window of the computing device, the progress of the modification of the application.

9. The method of claim 8, wherein displaying the progress of the modification on the active window comprises overlaying a screen indicating the progress of the modification on a user interface that prompts the user to complete the modification.

10. A system for modifying applications without user input, the system comprising:
  a prompting module, stored in memory, that prompts a user of a computing device to enable permissions on the computing device required by an accessibility service that provides user interface enhancements for disabled individuals on an operating system installed on the computing device;
  an identification module, stored in memory, that identifies, after the permissions are enabled, a need to modify at least one application on the computing device based on an administrator-defined policy associated with the application;
  an initiating module, stored in memory, that:
    removes the user's control of the computing device to prevent the user from interfering with the modification;
    initiates modification of the application on the computing device after removing the user's control of the computing device;
  a monitoring module, stored in memory, that while the application is being modified, monitors event notifications generated by the accessibility service;
  a determination module, stored in memory, that determines, based on an analysis of an event notification generated by the accessibility service, that the user of the computing device is prompted, on the computing device, to enable permissions necessary to modify the application;
  a supplying module, stored in memory, that in response to determining that the user is prompted to enable the permissions, automatically enables the permissions via the accessibility service in order to complete the modification of the application;
  at least one processor that executes the prompting module, the identification module, the initiating module, the monitoring module, the determination module, and the supplying module.

11. The system of claim 10, wherein the administrator-defined policy requires at least one of:
  the application to be installed onto the computing device:
  the application to receive an available update;
  the application to be uninstalled from the computing device based on the application representing a security threat.

12. The system of claim 10, wherein the initiating module initiates modification of the application by at least one of:
  launching an application distribution platform installed on the computing device that facilitates installing and/or updating applications;
  launching an application manager installed on the computing device that facilitates uninstalling applications.

13. The system of claim 10, wherein the initiating module removes the user's control of the computing device by at least one of:
  prohibiting the user from entering input into the computing device;
  overriding instructions issued by the user.

14. The system of claim 10, wherein the event notifications generated by the accessibility service include at least one of:

an indication that a user interface of the computing device has changed;

information that indicates content of the user interface.

15. The system of claim 10, wherein the determination module determines that the user is prompted to enable the permissions necessary to modify the application by analyzing at least one of:

a layout of an active window displayed on the computing device;

content of the active window.

16. The system of claim 10, wherein the determination module determines that the user is prompted to enable the permissions necessary to modify the application by at least one of:

determining the user is prompted to click a button;

determining the user is prompted to enter credentials that authenticate the user.

17. The system of claim 10, wherein the supplying module automatically supplies the input in order to complete the modification of the application by displaying, on an active window of the computing device, the progress of the modification of the application.

18. A non-transitory computer-readable medium comprising one or more computer-executable instructions that, when executed by at least one processor of a computing device, cause the computing device to:

prompt a user of the computing device to enable permissions on the computing device required by an accessibility service that provides user interface enhancements for disabled individuals on an operating system installed on the computing device; after the permissions are enabled, identify a need to modify at least one application on the computing device based on an administrator-defined policy associated with the application;

in response to identifying the need to modify the application based on the administrator-defined policy, remove the user's control of the computing device to prevent the user from interfering with the modification;

after removing the user's control of the computing device:
    initiate modification of the application on the computing device;
    while the application is being modified, monitor event notifications generated by the accessibility service;
    determine, based on an analysis of an event notification generated by the accessibility service, that the user of the computing device is prompted, on the computing device, to enable permissions necessary to modify the application;
    in response to determining that the user is prompted to enable the permissions, automatically enabling the permissions via the accessibility service in order to complete the modification of the application.

* * * * *